Aug. 25, 1925. 1,551,119

L. RADEK

DISPENSING DEVICE

Filed March 18, 1924

Inventor
L. Radek
By Clarence O'Brien
Attorney

Patented Aug. 25, 1925.

1,551,119

UNITED STATES PATENT OFFICE.

LADISLAV RADEK, OF CHICAGO, ILLINOIS.

DISPENSING DEVICE.

Application filed March 18, 1924. Serial No. 700,144.

*To all whom it may concern:*

Be it known that I, LADISLAV RADEK, a citizen of the United States, residing at Chicago, in the county of Cook and State of Illinois, have invented certain new and useful Improvements in Dispensing Devices, of which the following is a specification.

This invention relates to new and useful improvements in dispensing devices and is more particularly adapted to a sugar bowl and has for its principal object to provide a means whereby a predetermined quantity of sugar may be dispensed thereby preventing any unnecessary loss or waste as frequently occurs with the sugar bowls now in use.

A further object of the invention is to provide a dispensing device of the above mentioned character which is of such a construction as to enable the same to be readily disassembled for refilling the pockets or chambers with the granular material which is to be dispensed.

A further object of the invention is to provide a dispensing device of the above mentioned character, which is of such a construction as to enable a quantity of sugar or the like to be proportioned in predetermined quantities in such a manner as to discharge only a predetermined amount upon the actuation of the dispensing device.

A further object of the invention is to provide a dispensing device of the above mentioned character, which is simple in construction, inexpensive, strong and durable, and further well adapted for the purposes for which it is designated.

Other objects and advantages of this invention will become apparent during the course of the following description.

Figure 1:
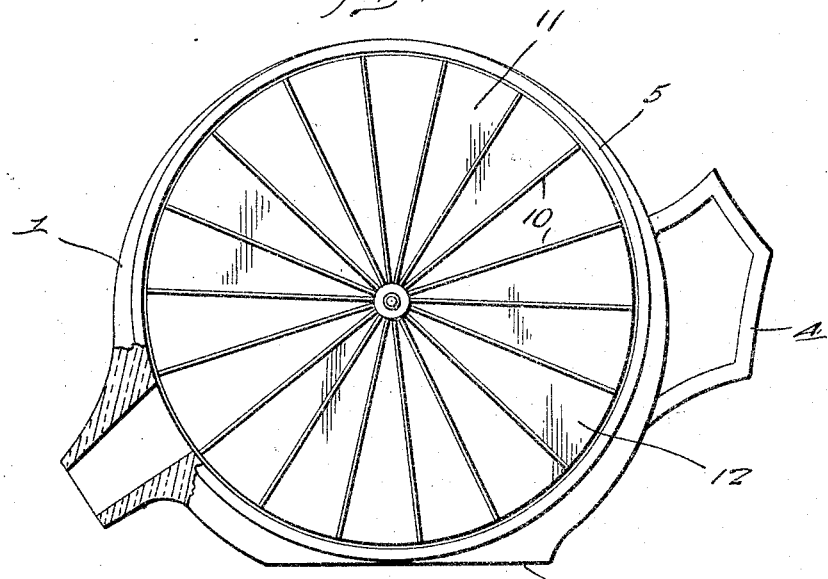
Figure 2:
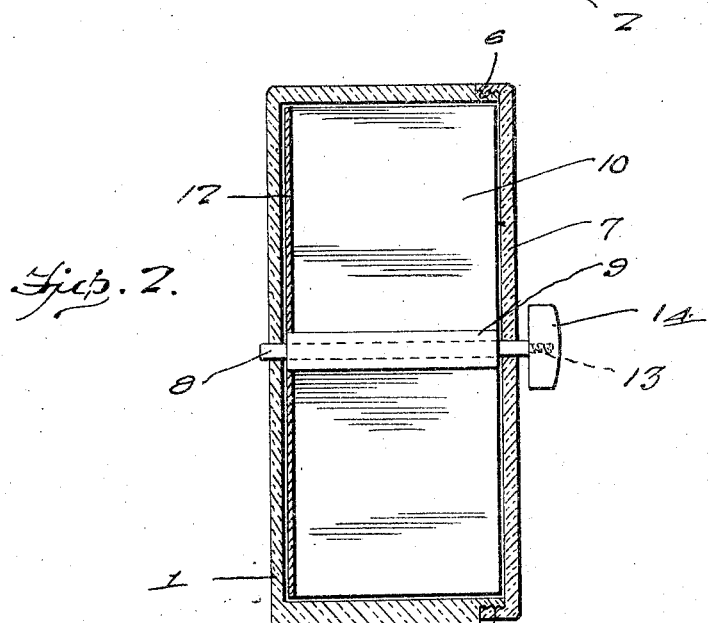

In the accompanying drawing forming a part of this specification and in which like numerals designate like parts throughout the same, Figure 1 is a side elevation of my improved dispensing device with the cover removed therefrom and the discharge spout being shown in section, and Figure 2 is a vertical sectional view through the casing with the cover mounted thereon and with the rotary member supported therein.

In the drawing wherein for the purpose of illustration is shown the preferred embodiment of my invention, the numeral 1 designates a substantially circular casing which is open at its front side in the manner as clearly shown in the drawing. The casing 1 is preferably formed of glass, although it is to be understood that any other suitable material may be substituted therefor. The base portion of the casing 1 is substantially flat as shown at 2 in the drawing, to provide a means whereby the casing may be properly supported upon any flat surface, such as a table or the like. Also formed on the periphery of the casing 1 adjacent the base thereof, is the spout 3 which is adapted to communicate with the rotary member hereinafter to be more fully described. For the purpose of handling the casing when in use, a suitable handle illustrated at 4 in the drawing is provided on the peripheral face of the casing directly opposite the spout 3.

The casing 1 is furthermore provided with the externally threaded reduced portion 5 which is arranged on the periphery of the casing adjacent the front face thereof and the purpose of this construction is to provide a means for cooperating with the interiorly threaded flanges 6 of the cover 7 which is also formed of glass. When the glass cover 7 is threaded onto the front face of the casing 1, in the manner shown in Figure 2 of the drawing, the granular material supported in the rotary member mounted in the casing will be prevented from being discharged outwardly through the front face of the casing.

Extending transversely through the center of the casing 1 and cover 7 therefor, is the shaft 8 and keyed to the shaft 8 otherwise forming a part thereof is the hub portion 9. Extending radially from the hub portion 9 are the blades 10, any number of blades may be provided as is desired, and I do not wish to limit myself to the particular number of radial blades which may be used. The blades 10 provide a plurality of pockets or chambers 11 for the purpose of holding the granular material such as sugar or the like. Carried by the hub 9 and extending flush with the rear longitudinal edges of the blades 10 is the plate or disk 12. This plate 12 when in position within the casing will extend in close proximity to the rear wall of the casing in the manner as clearly shown in Figure 2 of the drawing.

The front longitudinal edges of the radial blades 10 do not have a plate similar to the plate 12 operating therewith but are adapted to extend in close proximity to the inner face of the cover 7 when the cover is in position on the casing. For the purpose of actuating the rotary member within the casing 1, I provide the shaft 8 with a threaded extension 13 upon which is supported the handle 14, the same being preferably arranged on the outer side of the cover 7.

In use, the casing 1 is placed on its rear face, a rotary member is then inserted therein so that the base plate 12 will rest against the inner face of the rear face of the casing 1. The granular material, such as sugar or the like, is then poured into each of the chambers or pockets 11 until the same have been filled to the desired quantity. The cover 7 is then placed over the end of the shaft 8 and is threaded in position on the casing so as to prevent the sugar within each of the chambers from being spilled out through the front side of the rotary member. When it is desired to obtain a quantity of sugar from the dispensing apparatus, the handle 14 is turned so that a rotary member will be rotated in the casing and whereby one of the chambers will have its peripheral discharge outlet in communication with the spout 3 and by gravity or by tilting the casing by means of the handle 4, the sugar will be dispensed through the discharge outlet 3 into the cup or other receptacle, as is desired.

By providing a dispensing apparatus of the above mentioned character, only a predetermined quantity of granular material such as sugar may be dispensed thereby preventing any unnecessary loss or waste as occurs in obtaining granular material in small quantities from a large receptacle by means of a spoon or the like. A device of the above mentioned character is furthermore very useful in restaurants and similar places and the simplicity with which my device is constructed, enables the same to be readily disassembled in order to refill the chambers when the same have become empty. The chambers are arranged so that each contains substantially a teaspoonful of sugar. A dispensing device of this character may not only be used for sugar, but may also be used for dispensing flour or any other granular material, and I do not wish to limit myself to the particular use for which my device is adapted.

While I have shown the preferred embodiment of my invention, it is to be understood that various changes in the size, shape and arrangement of parts may be resorted to without departing from the spirit of the invention and the scope of the appended claim.

Having thus described my invention, what I claim is:

A dispensing device of the class described comprising a substantially circular casing open on one side having a substantially flat bottom forming a base, and also having a discharge opening in its peripheral wall, a spout leading from said discharge opening, a handle on said casing, a rotary member supported in said casing and including a hub, and a plurality of blades extending radially therefrom and arranged in circumferentially spaced relation, an end plate secured to the longitudinal edges of the blades on one side of the rotary member, a cover plate for the open side of said casing, said cover plate cooperating with the opposite side of said rotary member to form a plurality of pockets between the blades, the outer ends of the pockets being open to successively discharge material contained therein through said spout, a shaft extending through and rigidly secured to the aforesaid hub, bearings provided in said casing and cover plate, the end portions of the shaft being journaled for rotation in the bearings, and one end of the shaft being exposed to the exterior of the casing, and a finger piece attached to said exposed end for turning said shaft and rotary member.

In testimony whereof I affix my signature.

LADISLAV RADEK.